(12) United States Patent
Urushibata et al.

(10) Patent No.: US 11,643,129 B2
(45) Date of Patent: May 9, 2023

(54) STEERING BODY

(71) Applicant: KABUSHIKI KAISHA TOKAI-RIKA-DENKI-SEISAKUSHO, Aichi (JP)

(72) Inventors: Tetsushi Urushibata, Aichi (JP); Ryohei Sugimoto, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 386 days.

(21) Appl. No.: 16/978,527

(22) PCT Filed: Mar. 5, 2019

(86) PCT No.: PCT/JP2019/008677
§ 371 (c)(1),
(2) Date: Sep. 4, 2020

(87) PCT Pub. No.: WO2019/181485
PCT Pub. Date: Sep. 26, 2019

(65) Prior Publication Data
US 2021/0016819 A1 Jan. 21, 2021

(30) Foreign Application Priority Data
Mar. 22, 2018 (JP) .............................. JP2018-053883

(51) Int. Cl.
*B62D 1/06* (2006.01)
*G01D 5/241* (2006.01)

(52) U.S. Cl.
CPC ............. *B62D 1/06* (2013.01); *G01D 5/2417* (2013.01)

(58) Field of Classification Search
CPC .......... B62D 1/06; B62D 1/065; B62D 1/046; B62D 1/08; B62D 1/10; B60Q 1/0082; B60Q 3/283
See application file for complete search history.

(56) References Cited

U.S. PATENT DOCUMENTS

| | | | |
|---|---|---|---|
| 2005/0242965 A1* | 11/2005 | Rieth | B62D 1/046 340/576 |
| 2014/0109719 A1* | 4/2014 | Lisseman | B62D 1/06 74/552 |
| 2014/0111325 A1* | 4/2014 | Lisseman | B62D 1/06 340/435 |
| 2014/0253151 A1* | 9/2014 | Kandler | G01L 1/144 324/686 |

(Continued)

FOREIGN PATENT DOCUMENTS

| | | |
|---|---|---|
| JP | 06-027494 Y | 7/1994 |
| JP | 2015-502282 A | 1/2015 |
| WO | 2014/123222 A1 | 8/2014 |

*Primary Examiner* — Richard W Ridley
*Assistant Examiner* — Brian J McGovern
(74) *Attorney, Agent, or Firm* — Thomas W. Cole; Calderon Safran & Cole P.C.

(57) ABSTRACT

At a rim portion of a steering wheel, a shielding layer is disposed between a sensor electrode and a rim metal core portion. The shielding layer extends with respect to the sensor electrode. Therefore, generation of capacitive coupling between the sensor electrode and the rim metal core portion can be suppressed properly by the shielding layer, and parasitic capacitance that is generated at the sensor electrode can be reduced.

7 Claims, 3 Drawing Sheets

(56) References Cited

U.S. PATENT DOCUMENTS

| | | | |
|---|---|---|---|
| 2015/0048845 A1* | 2/2015 | Petereit | G01R 27/2605 |
| | | | 324/663 |
| 2015/0336601 A1* | 11/2015 | Van'tZelfde | B62D 1/065 |
| | | | 307/9.1 |
| 2015/0369633 A1 | 12/2015 | Karasawa et al. | |
| 2016/0025281 A1* | 1/2016 | Gardner | B60Q 9/00 |
| | | | 362/520 |
| 2017/0129499 A1* | 5/2017 | Odate | B60K 37/06 |
| 2017/0334477 A1* | 11/2017 | Bossier | G01D 5/2417 |
| 2018/0009462 A1* | 1/2018 | Yamamoto | B44F 9/02 |
| 2018/0348392 A1* | 12/2018 | Nishio | B62D 1/046 |
| 2019/0275935 A1* | 9/2019 | Lisseman | B60Q 3/62 |

* cited by examiner

STEERING BODY

CROSS-REFERENCE TO RELATED APPLICATIONS

The present application is a U.S. National Phase of PCT/JP2019/008677 filed on Mar. 5, 2019, claiming priority under 35 USC 119 from Japanese Patent Application No. 2018-053883 filed Mar. 22, 2018, the disclosure of which is incorporated by reference herein.

TECHNICAL FIELD

The present invention relates to a steering body.

BACKGROUND ART

In the sensor for a steering wheel of Japanese Utility Model Application Publication (JP-Y) No. 06-27494, an external electrode is provided at the outer peripheral side of a metal core of a ring portion, and the electrostatic capacitance between the metal core and the external electrode is detected.

By the way, if a portion of the metal core were not provided, and an electrically conductive member were provided at the inner peripheral side of the metal core, and capacitive coupling is generated between the external electrode and the electrically conductive member, parasitic capacitance would be generated at the external electrode.

SUMMARY OF INVENTION

Technical Problem

The present invention was made in consideration of the above-described circumstances, and an object thereof is to provide a steering body at which the parasitic capacitance that is generated at a sensor electrode can be made to be small.

Solution to Problem

A steering body of a first aspect of the present invention comprises: a grasped portion by which a vehicle is steered due to the grasped portion being grasped and operated by a vehicle occupant; a sensor electrode that is provided at a portion of an outer peripheral portion of the grasped portion, and by which electrostatic capacitance between the sensor electrode and a nearby vehicle occupant is detected; an electrically conductive member that is provided at the grasped portion at an inner side of the sensor electrode; and a shielding member that is provided at the grasped portion between the sensor electrode and the electrically conductive member, that extends out with respect to the sensor electrode, and that suppresses generation of capacitive coupling between the sensor electrode and the electrically conductive member.

In a steering body of a second aspect, in the steering body of the first aspect, the shielding member surrounds the electrically conductive member.

A steering body of a third aspect comprises, in the steering body of the first or second aspect, a decorative member that is provided at a portion of the outer peripheral portion of the grasped portion, and at which the sensor electrode is not provided at the grasped portion inner side.

Advantageous Effects of Invention

In the steering body of the first aspect, the vehicle is steered by the grasped portion being grasped and operated by a vehicle occupant. Further, the sensor electrode is provided at a portion of the outer peripheral portion of the grasped portion, and the electrostatic capacitance between the vehicle occupant, who is near the sensor electrode, and the sensor electrode is detected. Moreover, the electrically conductive member is provided at the grasped portion at the inner side of the sensor electrode. The shielding member is provided at the grasped portion between the sensor electrode and the electrically conductive member. The shielding member suppresses generation of capacitive coupling between the sensor electrode and the electrically conductive member.

Here, the shielding member extends out with respect to the sensor electrode. Therefore, the generation of capacitive coupling between the sensor electrode and the electrically conductive member can be suppressed properly, and the parasitic capacitance that is generated at the sensor electrode can be made to be small.

At the steering body of the second aspect, the shielding member surrounds the electrically conductive member. Therefore, generation of capacitive coupling between the sensor electrode and the electrically conductive member can be suppressed effectively, and the parasitic capacitance that is generated at the sensor electrode can be made to be small effectively.

At the steering body of the third aspect, the decorative member is provided at a portion of the outer peripheral portion of the grasped portion, and the sensor electrode is not provided at a grasped portion inner side of the decorative member. Therefore, even in a case in which the sensor electrode is not provided at the grasped portion inner side of the decorative member, due to the shielding member extending out with respect to the sensor electrode, the generation of capacitive coupling between the sensor electrode and the electrically conductive member can be suppressed properly, and the parasitic capacitance that is generated at the sensor electrode can be made to be small.

DESCRIPTION OF EMBODIMENTS

An embodiment of the present invention is described in detail hereinafter with reference to the drawings.

Figure 1:
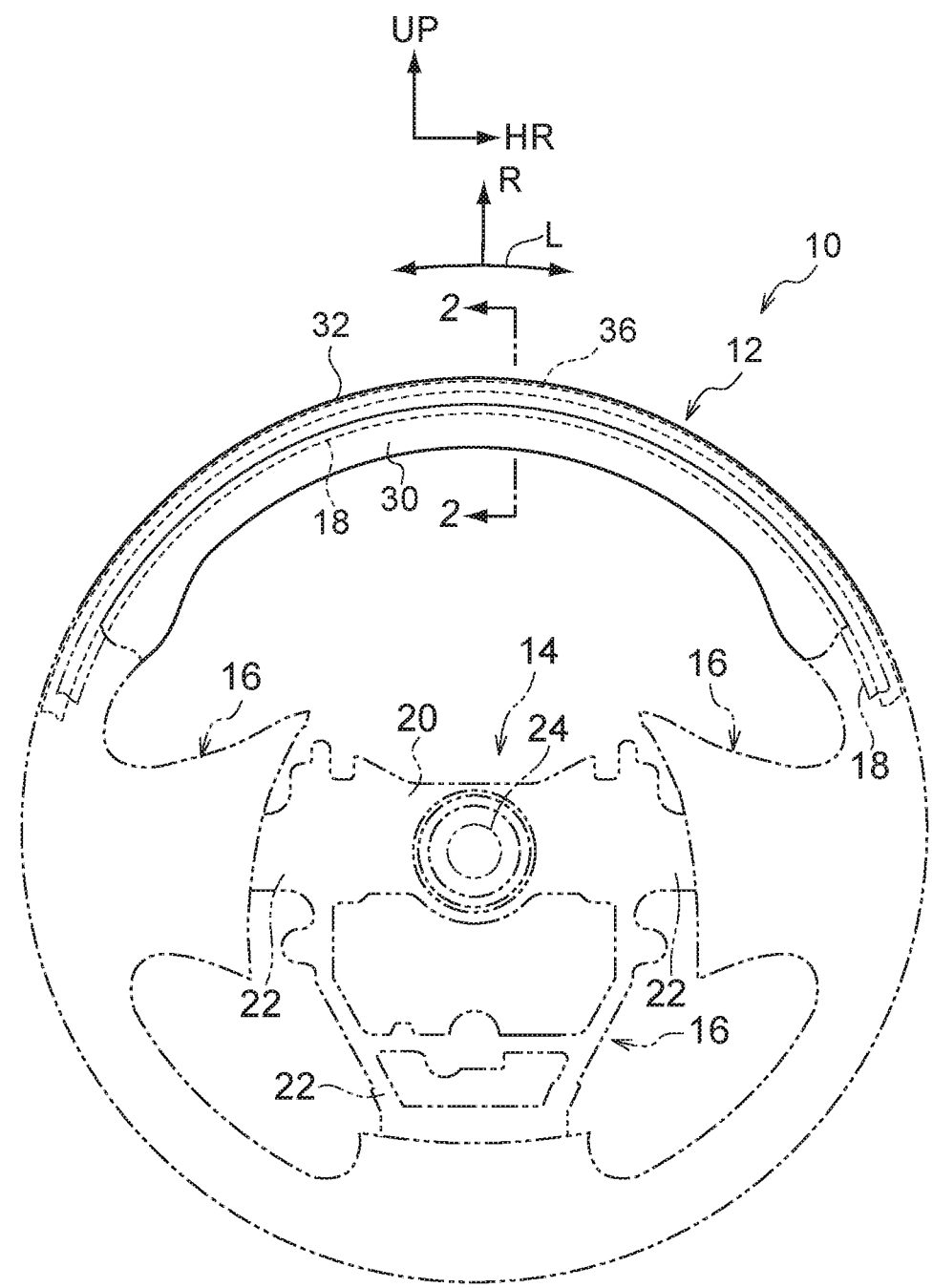
FIG. 1 is a front view showing the schematic structure of a steering wheel relating to a present embodiment.
Figure 2:
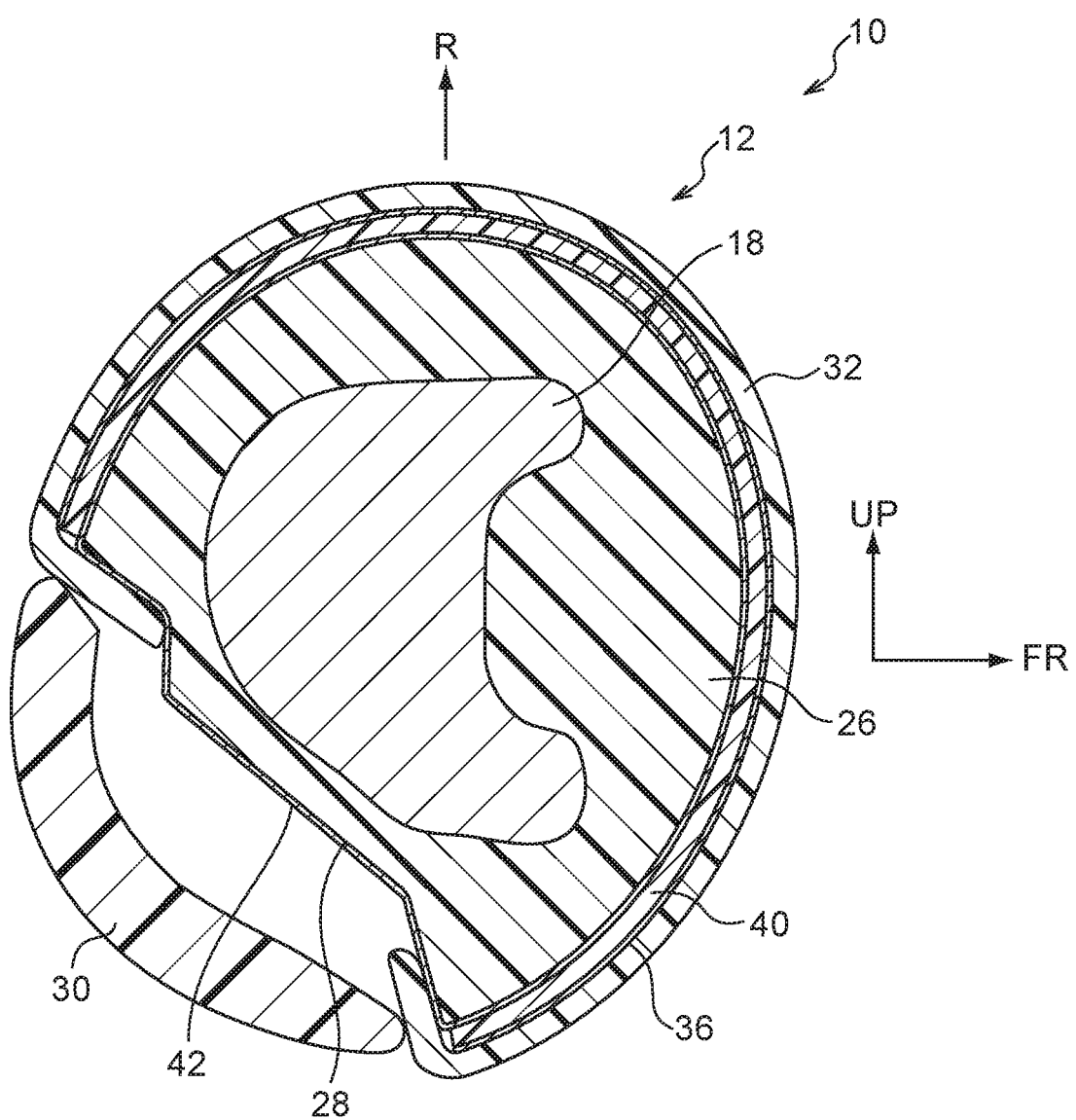
FIG. 2 is a cross-sectional view, along line 2-2 of FIG. 1, showing a rim portion of the steering wheel.

A steering wheel 10, which serves as a steering body relating to the present embodiment, is shown in FIG. 1 and FIG. 2. The steering wheel 10 is provided at a steering device that serves as the steering device of the vehicle, and is disposed at the vehicle front side of the seat (the driver's seat) in which the vehicle occupant who drives the vehicle (the driver) is seated. The schematic structure of the steering wheel 10 is shown in a front view in FIG. 1, and main portions of the steering wheel 10 are shown in a cross-sectional view, which is cut along the radial direction of the steering wheel 10, in FIG. 2. Note that, in the drawings, the radial direction of the steering wheel 10 is indicated by arrow R, and the peripheral direction of the steering wheel 10 is indicated by arrow L. Further, in the drawings, the vehicle front side is indicated by arrow FR, the vehicle transverse direction right side is indicated by arrow HR, and the upper side is indicated by arrow UP.

As shown in FIG. 1, the steering wheel 10 is structured by a rim portion 12 that is annular and serves as a grasped portion, a boss portion 14 that is provided at the axially central portion of the rim portion 12, and stay portions 16. Further, a metal core, which is made of medal and serves as an electrically conductive member that can become a contact-side electrode, is provided at the steering wheel 10. The metal core forms the frame of the steering wheel 10. The metal core is structured by a rim metal core portion 18 of the rim portion 12, a boss metal core portion 20 of the boss portion 14, and stay metal core portions 22 of the stay portions 16. At the steering wheel 10, the rim metal core portion 18 and the boss metal core portion 20 are connected by the stay metal core portions 22, and the rim portion 12, the boss portion 14 and the stay portions 16 are made integral.

A steering shaft 24 is provided at the steering device. The steering shaft 24 is rotatably supported at the vehicle body. At the steering wheel 10, the boss metal core portion 20 is fixed to the steering shaft 24, and the steering wheel 10 is supported at the steering shaft 24 and can rotate integrally with the steering shaft 24.

Therefore, due to the steering wheel 10 being rotated, the steering shaft 24 is rotated, and the vehicle is steered. Note that the steering wheel 10, which is at the rotational position in the state in which the vehicle is being made to advance straight forward (the straight forward steering position), is illustrated in FIG. 1.

As shown in FIG. 2, the steering wheel 10 radial direction cross-section of the rim portion 12 of the steering wheel 10 is substantially circular, and a base body 26 is disposed within the rim portion 12. A resin material, such as urethane or the like that serves as an insulating material, is used for the base body 26. The base body 26 is formed in an annular shape, and the steering wheel 10 radial direction cross-sectional outer periphery thereof is substantially circular. The rim metal core portion 18 is accommodated by insert molding in the interior of the base body 26, and the rim metal core portion 18 is covered by the base body 26.

A stepped portion 28 is formed at the upper side portion of the base body 26, at a portion that is at the driver's side (the vehicle rear side) and the steering wheel 10 radial direction inner side. The stepped portion 28 is continuous in the steering wheel 10 peripheral direction of the base body 26.

A decorative panel 30 that serves as a decorative member covers the stepped portion 28 of the base body 26, and the decorative panel 30 is mounted to the base body 26 in a state of being continuous in the steering wheel 10 peripheral direction. The decorative panel 30 projects-out from the base body 26 toward the rim portion 12 radial direction outer side. The decorative panel 30 is disposed over a range of substantially ¼ of the periphery in the rim portion 12 peripheral direction, and the outer side surface thereof structures a portion of the design surface of the rim portion 12. Note that the decorative member is not limited to the decorative panel 30 that is formed of resin, and may be made of wood (wood grain).

A leather layer 32, which is made of leather and serves as an insulating member, is fixed to the outer peripheral portion of the rim portion 12. The leather layer 32 is wound onto portions of the outer peripheral portion of the rim portion 12 at the position of the decorative panel 30, and is wound onto the entire steering wheel 10 peripheral direction region. Further, the peripheral edges, which are at the decorative panel 30 side, of the leather layer 32 are nipped between the stepped portion 28 of the base body 26 and the decorative panel 30, and due thereto, the peripheral edge portions, which are at the decorative panel 30 side, of the leather layer 32 are covered by the decorative panel 30. The leather layer 32 is disposed over a range of substantially ¾ of the periphery at the outer peripheral portion of the rim portion 12, and the design surface is formed at the rim portion 12 by the decorative panel 30 and the leather layer 32.

On the other hand, a contact detecting device (touch sensor) 34 relating to the present embodiment is provided at the steering device. The contact detecting device 34 detects whether the rim portion 12 of the steering wheel 10 is being grasped by the driver. The schematic structure of the contact detecting device 34 is shown in FIG. 3.

Figure 3:
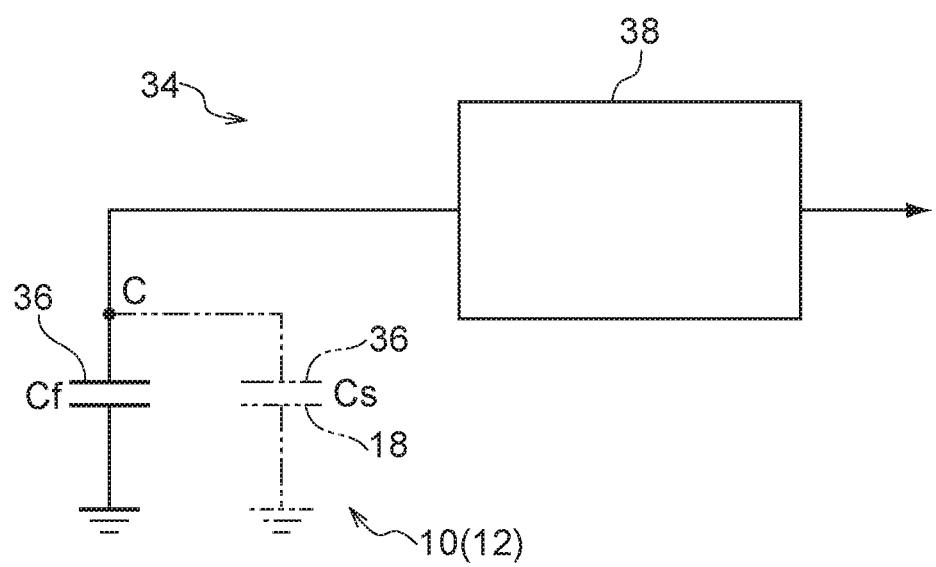
FIG. 3 is a schematic structural drawing of a contact detecting device relating to the present embodiment.

As shown in FIG. 3, the contact detecting device 34 has a sensor electrode 36 that is sheet-shaped (or may be film-like), and a detecting section 38. The sensor electrode 36 is electrically connected to the detecting section 38, and the detecting section 38 detects electrostatic capacitance C that is generated at the sensor electrode 36.

As shown in FIG. 2, the sensor electrode 36 is disposed at an insulator 40 that is shaped as an elongated strip and serves as an insulating material. The insulator 40 is formed of a resin material that is elastically deformable, and the sensor electrode 36 is affixed to the entirety of one surface of the insulator 40.

At the rim portion 12, the sensor electrode 36 and the insulator 40 are disposed between the base body 26 and the leather layer 32, at the portion other than the decorative panel 30. The sensor electrode 36 is disposed at a portion of the outer peripheral portion of the rim portion 12. At the sensor electrode 36 and the insulator 40, the sensor electrode 36 is at the leather layer 32 side, and is wound on the base body 26 in the rim portion 12 peripheral direction.

Further, as shown in FIG. 1, the sensor electrode 36 and the insulator 40 extend in the steering wheel 10 peripheral direction, and the sensor electrode 36 and the insulator 40 are disposed over substantially the entire periphery in the steering wheel 10 peripheral direction. Due thereto, at the time when the driver grasps the rim portion 12 of the steering wheel 10 (at the time when the driver contacts the rim portion 12), the hands of the driver are near to the sensor electrode 36 via the leather layer 32, and the electrostatic capacitance C (Cf) that is generated between the sensor electrode 36 and the hands of the driver is detected by the detecting section 38.

A shielding layer 42 that serves as a shielding member is provided at the base body 26 of the rim portion 12. A film-like electrically conductive material is used for the shielding layer 42. The shielding layer 42 is wound on the outer peripheral portion of the base body 26, and the shielding layer 42 covers the entire periphery of the base body 26 (the entire periphery in the peripheral direction of the rim portion 12 and the entire periphery in the steering wheel 10 peripheral direction). Further, the shielding layer 42 is disposed between the base body 26 and the decorative panel 30, and between the base body 26 and the insulator 40, and is insulated with respect to the sensor electrode 36 and with respect to the rim metal core portion 18. Due thereto, the sensor electrode 36 side of the rim metal core portion 18 is covered by the shielding layer 42 over the entire steering wheel 10 peripheral direction, and the rim metal core portion 18 is surrounded by the shielding layer 42 over the entire rim portion 12 peripheral direction.

Operation of the present embodiment is described next.

At the steering wheel 10, due to the driver grasping the rim portion 12, the hands of the driver are near to the sensor electrode 36. Therefore, the electrostatic capacitance Cf is generated between the sensor electrode 36 and the driver, and the electrostatic capacitance C that is detected at the detecting section 38 increases. Due thereto, the detecting section 38 detects that the driver is grasping the rim portion 12.

By the way, the rim metal core portion 18 is disposed at the rim portion 12. If capacitive coupling is generated at the sensor electrode 36 between the sensor electrode 36 and the rim metal core portion 18, parasitic capacitance Cs is generated at the sensor electrode 36. In this case, due to the parasitic capacitance Cs being included in the electrostatic capacitance C that is detected at the detecting section 38, at the detecting section 38, the robustness of the results of detection deteriorates, and the accuracy of detection deteriorates.

Here, the shielding layer 42 is disposed between the rim metal core portion 18 of the rim portion 12 and the sensor electrode 36. The shielding layer 42 extends from the peripheral edge portion of the sensor electrode 36. Therefore, capacitive coupling between the sensor electrode 36 and the rim metal core portion 18 can be suppressed. Due thereto, at the sensor electrode 36, ratio (Cf/Cs) of the electrostatic capacitance Cf with respect to the parasitic capacitance Cs can be made to be large, and therefore, the robustness at the time when the detecting section 38 detects that the driver is grasping the rim portion 12 can be improved, and the detection accuracy of the detecting section 38 can be improved.

Further, the shielding layer 42 is provided so as to cover the entire steering wheel 10 peripheral direction region of the sensor electrode 36 side of the rim metal core portion 18. The shielding layer 42 blocks the entirety of the steering wheel 10 peripheral direction region that is between the rim metal core portion 18 and the peripheral edge portion, which is at the decorative panel 30 side, of the sensor electrode 36. Therefore, capacitive coupling being generated between the decorative panel 30 side end portions of the sensor electrode 36 and the rim metal core portion 18 can be suppressed effectively. Due thereto, the parasitic capacitance Cs that is generated at the sensor electrode 36 can effectively be made to be small, and the ratio (Cf/Cs) of the electrostatic capacitance Cf with respect to the parasitic capacitance Cs at the sensor electrode 36 can effectively be made to be large. Accordingly, even though the sensor electrode 36 is discontinuous at the position of the decorative panel 30, the robustness at the time when the detecting section 38 detects grasping of the rim portion 12 by the driver can be improved effectively, and the detection accuracy of the detecting section 38 can be improved effectively.

Moreover, at the steering wheel 10, the entire rim portion 12 peripheral direction region of the rim metal core portion 18 is surrounded by the shielding layer 42. Therefore, capacitive coupling being generated between the rim metal core portion 18 and the sensor electrode 36 can be suppressed effectively, and the parasitic capacitance Cs that is generated at the sensor electrode 36 can be suppressed effectively. Due thereto, capacitive coupling being generated between the sensor electrode 36 and the rim metal core portion 18 can be effectively suppressed, and the ratio of the electrostatic capacitance Cf with respect to the parasitic capacitance Cs at the sensor electrode 36 can effectively be made to be large.

Accordingly, at the steering wheel 10, the robustness at the time when the detecting section 38 detects proximity of the driver can be improved more, and the detection accuracy of the detecting section 38 can be improved more.

Note that, in the above-described present embodiment, the decorative panel 30 and the leather layer 32 are provided. However, the outer peripheral portion of the rim portion may be covered by the leather layer only without providing the decorative panel, or the outer peripheral portion of the rim portion may be covered by a resin layer that is sheet-shaped or is tubular.

Further, the electrically conductive member is made to be the rim metal core portion 18 in the present embodiment. However, in a case in which an electric heater that serves as a heating means is provided between the sensor electrode and the rim metal core of the rim portion of the steering wheel, the electrically conductive member may be made to the electric heater.

Moreover, in the present embodiment, the one sensor electrode 36 is provided over the entire steering wheel 10 peripheral direction. However, plural sensor electrodes may be provided at some regions in the steering wheel peripheral direction (e.g., at the vehicle transverse direction both sides at the straight forward steering position).

Further, in the present embodiment, the sensor electrode, which detects whether or not a vehicle occupant is grasping the rim portion 12 of the steering wheel 10, is provided. However, a sensor electrode may be used in detecting whether or not a vehicle occupant is contacting (operating by touch) the rim portion, or the like.

The disclosure of Japanese Patent Application No. 2018-53883 filed on Mar. 22, 2018 is, in its entirety, incorporated by reference into the present specification.

The invention claimed is:

1. A steering body comprising:
    a grasped portion by which a vehicle is steered due to the grasped portion being grasped and operated by a vehicle occupant, the grasped portion including a metallic core and a base body covering the metallic core;
    a stepped portion that is included in the base body and that is recessed radially toward an inner side of the base body;
    a decorative member that covers the stepped portion;
    a sensor electrode by which electrostatic capacitance between the sensor electrode and the vehicle occupant is detected;
    a shielding member provided at an outer peripheral portion of the base body between the sensor electrode and the metallic core and that extends circumferentially beyond the sensor electrode, and that circumferentially covers the stepped portion to suppress generation of capacitive coupling between the sensor electrode and the metallic core;
    wherein the sensor electrode does not circumferentially extend to cover the stepped portion.

2. The steering body of claim 1, wherein the decorative member is disposed over a range of substantially ¼ of a circumference of the grasped portion and the shielding member surrounds the electrically conductive member.

3. The steering body of claim 1, wherein the shielding member is an electrically conductive material that is film-shaped.

4. The steering body of claim 1, wherein the shielding member is insulated with respect to the sensor electrode and with respect to the metallic core.

5. The steering body of claim 1, further comprising a covering layer covering the sensor electrode.

6. The steering body of claim 1, wherein the decorative member does not cover all of the grasped portion.

7. The steering body of claim 1, wherein the decorative member covers only the stepped portion.

\* \* \* \* \*